(12) United States Patent
Brettes et al.

(10) Patent No.: US 9,551,365 B2
(45) Date of Patent: Jan. 24, 2017

(54) HYDRAULIC DEVICE OF A CONTROL DEVICE, SUCH AS A BLADE PITCH-CHANGE DEVICE

(75) Inventors: Frédéric Brettes, Moissy-Cramayel (FR); Alain François Jean Lavie, Moissy-Cramayel (FR)

(73) Assignee: SNECMA, Paris (FR)

( * ) Notice: Subject to any disclaimer, the term of this patent is extended or adjusted under 35 U.S.C. 154(b) by 677 days.

(21) Appl. No.: 13/876,115

(22) PCT Filed: Sep. 22, 2011

(86) PCT No.: PCT/FR2011/052193
§ 371 (c)(1),
(2), (4) Date: Mar. 26, 2013

(87) PCT Pub. No.: WO2012/045946
PCT Pub. Date: Apr. 12, 2012

(65) Prior Publication Data
US 2013/0180397 A1   Jul. 18, 2013

(30) Foreign Application Priority Data
Sep. 27, 2010   (FR) ...................... 10 57755

(51) Int. Cl.
  *F15B 15/20*   (2006.01)
  *B64C 11/38*   (2006.01)
  *F02K 1/76*    (2006.01)
  *F15B 15/14*   (2006.01)

(52) U.S. Cl.
  CPC ............. *F15B 15/20* (2013.01); *B64C 11/38* (2013.01); *F02K 1/763* (2013.01); *F15B 15/149* (2013.01)

(58) Field of Classification Search
  CPC ............................. F15B 15/149; F15B 21/005
  USPC ...................................... 92/86, 163
  See application file for complete search history.

(56) References Cited

U.S. PATENT DOCUMENTS

| 2,640,555 | A |   | 6/1953 | Cushman |
| 2,801,618 | A | * | 8/1957 | Place ................. G05D 1/0061 244/236 |
| 3,045,650 | A | * | 7/1962 | Ambrosini ........... F15B 15/149 277/563 |

(Continued)

FOREIGN PATENT DOCUMENTS

| DE | 4133188 A1 * | 4/1992 | ............... B62D 5/12 |
| DE | 19521101 A1 * | 12/1996 | ........... B21D 26/033 |

(Continued)

OTHER PUBLICATIONS

International Search Report as issued for PCT/FR2011/052193.

*Primary Examiner* — John K Fristoe, Jr.
*Assistant Examiner* — Matthew Wiblin
(74) *Attorney, Agent, or Firm* — Pillsbury Winthrop Shaw Pittman LLP

(57) ABSTRACT

A hydraulic device includes a body, a piston rod configured to be actuated by a pressurized hydraulic fluid, and a first drainage channel for externally draining an internal leakage of hydraulic fluid in the device. The device includes a second drainage channel for externally draining the internal leakage of hydraulic fluid in the device, the first and second channels being oriented in two different directions and each of the channels communicating at one of the ends thereof inside the body of the device.

14 Claims, 2 Drawing Sheets

(56) References Cited

U.S. PATENT DOCUMENTS

| | | | | |
|---|---|---|---|---|
| 3,972,396 A | * | 8/1976 | Bochnak | B64C 27/51 188/312 |
| 4,597,322 A | * | 7/1986 | Garnjost | F15B 15/1433 92/166 |
| 4,667,472 A | * | 5/1987 | Clay | B64C 13/40 244/227 |
| 4,887,515 A | * | 12/1989 | Tabata | F15B 15/149 188/315 |
| 5,094,143 A | * | 3/1992 | Andersen, Jr. | F15B 15/1433 137/884 |
| 2009/0019845 A1 | * | 1/2009 | Bovina | F16H 61/30 60/413 |

FOREIGN PATENT DOCUMENTS

| | | |
|---|---|---|
| GB | 2 365 073 | 2/2002 |
| JP | 53-44773 | 4/1978 |
| WO | WO 93/03258 | 2/1993 |

\* cited by examiner

HYDRAULIC DEVICE OF A CONTROL DEVICE, SUCH AS A BLADE PITCH-CHANGE DEVICE

CROSS-REFERENCE TO RELATED APPLICATIONS

This is the U.S. National Stage of PCT/FR2011/052193, filed Sep. 22, 2011, which in turn claims priority to French Patent Application No. 1057755, filed Sep. 27, 2010, the entire contents of all applications are incorporated herein by reference in their entireties.

The present invention relates to a hydraulic device of a control device.

The area of the invention is that of any system provided with a propeller, such as a wind generator, an industrial fan, but also turbomachines and turbojet engines provided with a fan comprising a plurality of blades with variable pitch angles.

In a known manner, a turbomachine comprises one or more stages of variable-pitch blades, which are mounted between the rotor wheels of a compressor. These variable-pitch blades are carried by the stator of the turbomachine and can be regulated in position about their axis to optimise the flow of gases into the engine of the turbomachine. Thus, the variation of the pitch of the blades makes it possible to increase the performance and to improve the output of the engine of a turbomachine during all its operating phases, from take-off to landing.

This variable pitch also makes it possible to vary the rpm of the propeller or the fan in order to obtain the desired thrust, without changing that of the turbine which is generally set to its continuous maximum rpm, and even to reverse this thrust during landing, thereby replacing the conventional heavy and complex reverse thrust systems.

The control devices for varying the pitch of propellers or fans are hydraulic actuators (cylinders impelling each of the blade roots), which provide the necessary force for orientating the blades into the desired position.

Each variable-pitch blade comprises a cylindrical pivot at each of its ends, these pivots defining the rotational axis of the blade. The radially external pivot of the blade is engaged in a cylindrical duct of an external annular casing which is connected by means of a link rod to an actuator ring mounted around the annular casing. The actuator ring, for its part, is connected by a lever to a control shaft operated by a hydraulic cylinder. Generally, the control shaft extends parallel to the axis of the casing and can be connected to one or more rings in such a way as to control one or more blade stages with a single cylinder.

The rod of the hydraulic cylinder is connected to the control shaft by a radial arm integral with the control shaft causing, by linear displacement of the cylinder rod, the rotation of each of the rings about the casing. The rotation of an actuator ring is transmitted by corresponding link rods to the external pivots of the blades of a stage causing them to rotate about their axes.

In a known manner, the hydraulic cylinder is supplied with hydraulic fluid and, for this purpose, comprises a hydraulic fluid inlet and outlet. In order to prevent any internal leakage of hydraulic fluid and to avoid any leakage of fluid towards the turbine with the risk of adversely affecting the performance of the turbine, of contaminating the turbine (contamination of bleed air), the hydraulic cylinders comprise a drain at each hydraulic fluid arrival point (i.e. at the entry and the exit of the fluid). The drains thus make it possible to recover by gravity any hydraulic fluid leakages which could occur during operation of the cylinder.

It is known that these drains are connected to pipes carrying the leakage towards recovery tanks capable of storing the hydraulic fluid.

However, depending on the position of the cylinder on the architecture of the fan and depending on the inclination of the turbomachine which can vary in the course of its operation, it happens that the provided drains do not wholly perform their function of carrying away the hydraulic leakage that may arise.

In this context, the invention aims to solve the aforementioned problems by proposing a hydraulic device of a control device making it possible to carry away any hydraulic fluid leakage whatever the position of the cylinder on the architecture.

To this end, the invention proposes a hydraulic device comprising a body, a piston rod actuated by a pressurised hydraulic fluid, a first drainage channel for externally draining an internal leakage of the hydraulic fluid in said device; said device being characterised in that it comprises a second drainage channel for externally draining said internal leakage of hydraulic fluid in the device; said first drainage channel and said second drainage channel being orientated in two different directions, each of said channels communicating at one of their ends with the interior of said body of said device.

Thanks to the invention, the function of draining any internal leakage in the hydraulic device is performed by two drainage channels whatever the position of the hydraulic device or whatever the positioning of the hydraulic device.

These two drainage channels are advantageously positioned in such a way that at least one channel is able to direct the internal hydraulic leakage towards the exterior of said device by gravity, whatever the position of said hydraulic device.

According to the invention, the same hydraulic device can be used and positioned in different places depending on the desired architecture. Thus, the use of a single hydraulic device permits the production costs to be reduced.

The hydraulic device according to the invention can also comprise one or more of the following features, considered individually or in any technically possible combinations:
- said two drainage channels form a V or X profile;
- said device comprises a supply plate on which a first admission and a second admission of hydraulic fluid into said body are arranged;
- said drainage channels emerge on said supply plate;
- said first drainage channel and said second drainage channel communicate with a third internal channel extending longitudinally in said body of said cylinder;
- said hydraulic device is a hydraulic device for changing a propeller pitch;
- said hydraulic device is a blade-pitch hydraulic device.

The subject-matter of the invention is also a control device comprising a hydraulic device according to the invention.

Other features and advantages of the invention will emerge more clearly from the description provided below by way of indication and on no account limiting, making reference to the appended figures, among which:

1 of the hydraulic device for changing the pitch of variable-pitch blades according to the invention.

Figure 1:
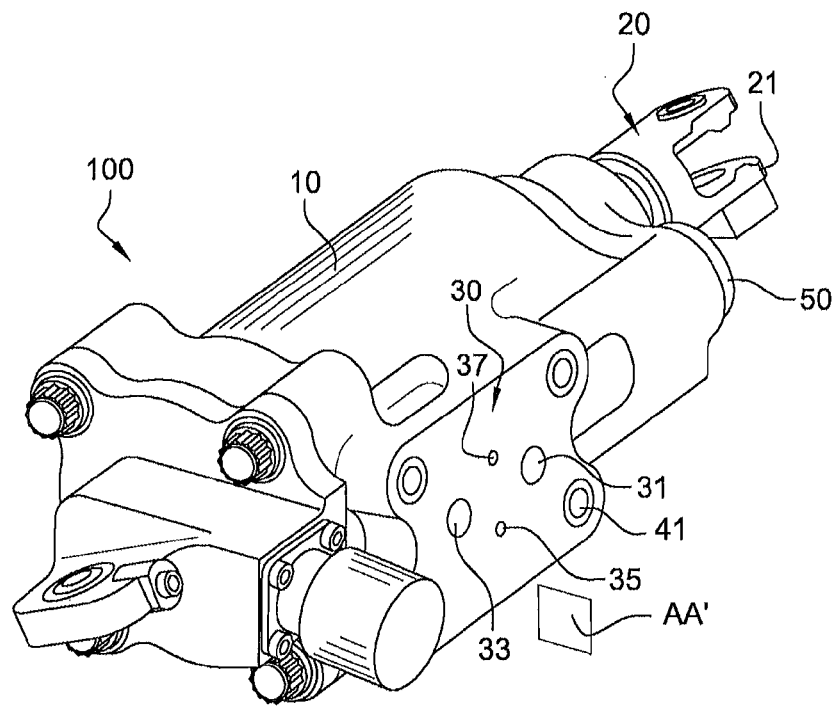
FIG. 1 is a perspective view of a hydraulic device for changing the pitch of variable-pitch blades according to the invention.
Figure 3:
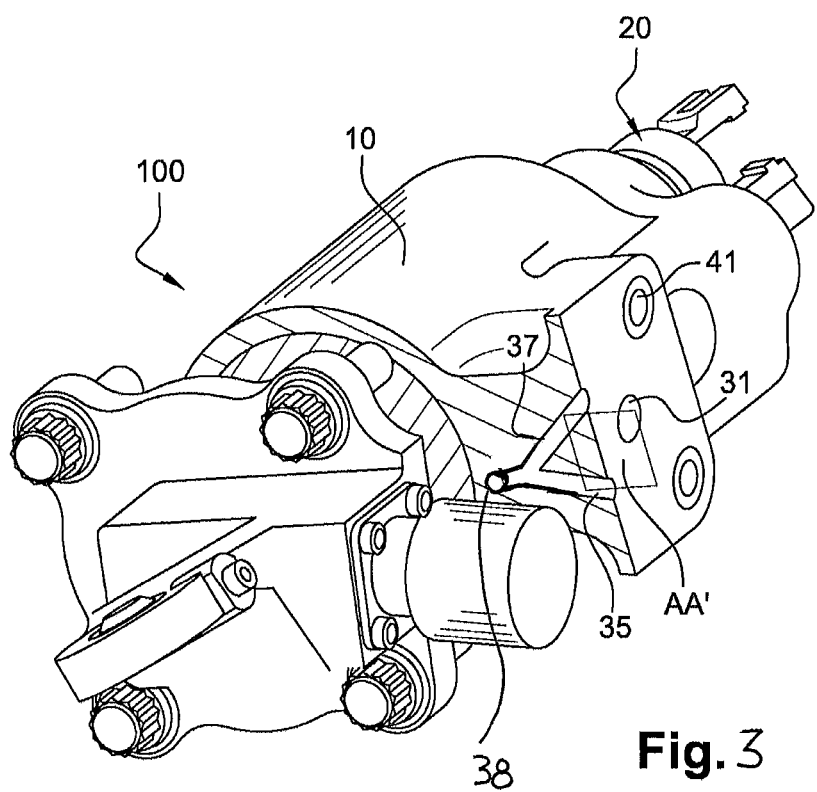

FIG. 3 is a perspective view containing an alternative local cross-section through cross-sectional plane AA' illustrated in FIG. 1 of the hydraulic device for changing the pitch of variable-pitch blades according to another embodiment of the invention.

In all the figures, common elements bear the same reference numbers unless indicated to the contrary.

FIG. 1 is a perspective view of a hydraulic device for changing the blade pitch of turbomachine 100. More particularly, the hydraulic device is a hydraulic cylinder intended to change the pitch angle of fan blades of a turbomachine (not represented) and is integrated into a control device for varying the pitch of the fan blades.

Each variable-pitch blade comprises a cylindrical pivot at each of its ends, these pivots defining the rotational axis of the blade. The radially external pivot of the blade is engaged in a cylindrical duct of an external annular casing which is connected by means of a link rod to an actuator ring mounted around the annular casing. The actuator ring, for its part, is connected by a lever to a control shaft operated by a hydraulic cylinder. Generally, the control shaft extends parallel to the axis of the casing and can be connected to one or more rings in such a way as to control one or more blade stages with a single cylinder.

Hydraulic cylinder 100 is conventionally formed by a body 10 and by a piston rod 20 of cylinder 100 actuated by the pressure of a hydraulic fluid circulating inside cylinder 100.

Piston rod 20 comprises at its free end a cap in a U-shape connected to the control shaft by a radial arm integral with the control shaft causing, by linear displacement of the cylinder rod, the rotation of each of the rings about the casing. The rotation of an actuator ring is transmitted by the corresponding link rods to the external pivots of the blades of a stage causing them to rotate about their axes.

Cylinder 100 comprises two hydraulic fluid admissions 31, 33 used both for the entry and exit of hydraulic fluid depending on the direction of displacement of piston rod 20.

The two admissions 31 and 33 are advantageously combined at one and the same point on supply plate 30 which is able to be connected to a supply unit (not represented) by means of a coupling 41. The combining of the hydraulic fluid admissions on one and the same supply plate 30 has the advantage of reducing the space requirement of the hydraulic fluid supply pipes and the environment of hydraulic cylinder 100 and thus of facilitating its maintenance.

Cylinder 100 also comprises two channels 35 and 37 emerging at supply plate 30. The two channels 35, 37 are drainage channels permitting any hydraulic fluid leakage inside cylinder 100 to be carried away, and in particular in the vicinity of hydraulic fluid admissions 31, 33.

The two drainage channels 35, 37 also communicate with a third channel 38 arranged inside the cylinder extending over a large part of the length of the body of cylinder 10 and capable of routing any hydraulic fluid leakages from the cylinder towards drainage channels 35, 37. The leakages are thus channelled and routed towards a recovery tank (not represented) outside cylinder 100. The third channel 38 is illustrated in FIG. 3, which shows an alternative cross-section view of FIG. 1. FIG. 3 differs from FIG. 2 in that the two drainage channels 35, 37 of FIG. 3 form a Y channel that connects to the third channel 38 which extends perpendicularly to the plane AA'. The cross section of the third channel 38, which extends perpendicularly to the plane AA', is represented in FIG. 3.

Figure 2:
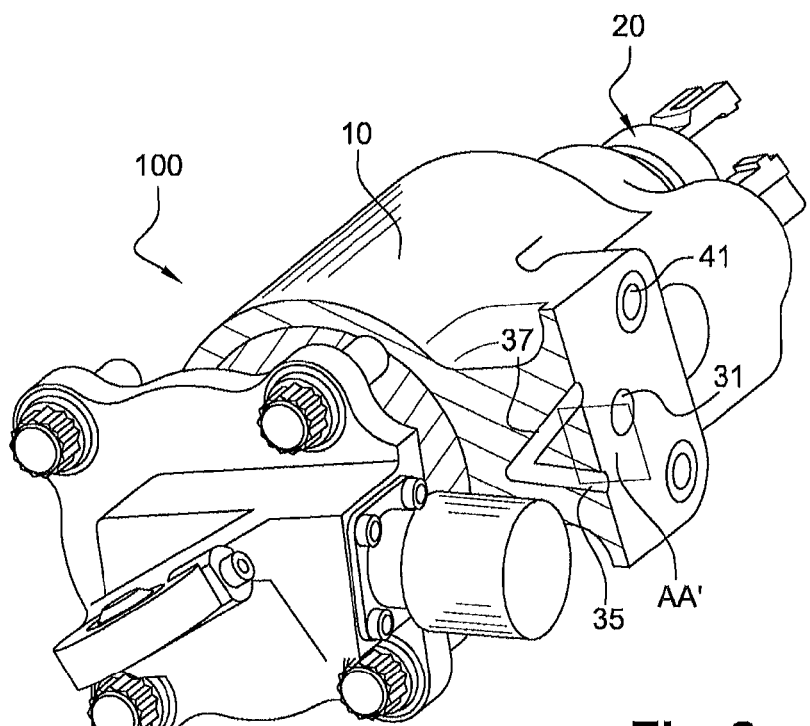
FIG. 2 is a perspective view containing a local cross-section through cross-sectional plane AA' illustrated in FIG.

According to the example of embodiment illustrated in FIGS. 1 and 2, the two drainage channels 35, 37 are arranged in such a way as to form a X profile or a V profile in a plane perpendicular to the longitudinal displacement of piston rod 20. However, the two drainage channels 35, 37 can also be arranged in such a way as to form a Y or a V profile in any other plane.

The two drainage channels 35, 37 also communicate with a third channel (not represented) arranged inside the cylinder extending over a large part of the length of the body of cylinder 10 and capable of routing any hydraulic fluid leakages from the cylinder towards drainage channels 35, 37. The leakages are thus channelled and routed towards a recovery tank (not represented) outside cylinder 100.

The different drainage channels 35, 37 and the third drainage channel are produced by a piercing process. The emerging end of the third channel is plugged at the surface by a plug 50 capable of producing the required tightness.

Thus, the two drainage channels 35, 37 forming a V or Y channel make it possible to provide a drainage directed downwards permitting a leakage to flow by gravity towards the exterior of the cylinder so as to be recovered in a dedicated tank whatever the position of the cylinder on the turbomachine architecture and whatever the position of the turbomachine in use (i.e. during steep inclination of the aircraft).

Thus, thanks to the device according to the invention, the number of different parts needed to produce the control device for changing the pitch of blades, or more generally of propellers, is reduced, which makes it possible to simplify the production range of such a device whilst at the same time reducing the production costs. Thanks to the advantageous architecture of the hydraulic device according to the invention, it is no longer necessary to design a plurality of specific cylinders, the design of the drainage pattern whereof is specific to the position of the cylinder on the fan, in order to ensure the drainage of a hydraulic leakage in a complete and secure manner whatever the position of the cylinder.

The invention has been described primarily for a hydraulic device for changing the pitch of variable-pitch blades of a turbomachine fan; however, the invention is also applicable to any system provided with propellers such as wind generators, industrial fans or turbojet engines.

The other advantages of the invention are in particular the following:
reduction in production costs;
reduction in production time;
simplification of production range;
reduction of tool costs;
reduction in material costs.

The invention claimed is:
1. A hydraulic device comprising:
a body;
a piston rod configured to be actuated by a pressurised hydraulic fluid;
a first drainage channel constructed and arranged to externally drain an internal leakage of the hydraulic fluid in said device, and
a second drainage channel constructed and arranged to externally drain said internal leakage of hydraulic fluid in the device; said first drainage channel and said second drainage channel being orientated in two different directions, said first and second drainage channels communicating with each other, and each of said first and second drainage channels further communicating at one of their ends with the interior of said body of said device,
wherein said two drainage channels form a V or Y profile.

2. The hydraulic device according to claim 1, comprising a supply plate on which a first admission and a second admission of hydraulic fluid into said body are arranged.

3. The hydraulic device according to claim 2, wherein said drainage channels emerge on said supply plate.

4. The hydraulic device according to claim 2, wherein said first drainage channel and said second drainage channel communicate with a third internal channel extending longitudinally in said body of said cylinder.

5. The hydraulic device according to claim 1, wherein said hydraulic device is a hydraulic device for changing a propeller pitch.

6. The hydraulic device according to claim 1, wherein said hydraulic device is a blade-pitch hydraulic device.

7. The hydraulic device according to claim 1, wherein the second drainage channel intersects the first drainage channel.

8. A control device comprising a hydraulic device including
a body;
a piston rod configured to be actuated by a pressurised hydraulic fluid;
a first drainage channel constructed and arranged to externally drain an internal leakage of the hydraulic fluid in said device, and
a second drainage channel constructed and arranged to externally drain said internal leakage of hydraulic fluid in the device; said first drainage channel and said second drainage channel being orientated in two different directions, said first and second drainage channels communicating with each other, and each of said first and second drainage channels further communicating at one of their ends with the interior of said body of said device,
wherein said two drainage channels form a V or Y profile.

9. The control device according to claim 8, wherein said hydraulic device further comprises a supply plate on which a first admission and a second admission of hydraulic fluid into said body are arranged.

10. The control device according to claim 9, wherein said drainage channels emerge on said supply plate.

11. The control device according to claim 9, wherein said first drainage channel and said second drainage channel communicate with a third internal channel extending longitudinally in said body of said cylinder.

12. The control device according to claim 8, wherein said hydraulic device is a hydraulic device for changing a propeller pitch.

13. The control device according to claim 8, wherein said hydraulic device is a blade-pitch hydraulic device.

14. The control device according to claim 8, wherein the second drainage channel intersects the first drainage channel.

* * * * *